April 9, 1929.  H. SPARKS ET AL  1,708,906

PARCEL CARRIER FOR BABY CARRIAGES AND THE LIKE

Filed May 12, 1928

INVENTORS.
H. Sparks.
S. Sparks.
BY J. Edward Maybee.
ATTY.

Patented Apr. 9, 1929.

1,708,906

UNITED STATES PATENT OFFICE.

HARRY SPARKS AND SARAH SPARKS, OF TORONTO, ONTARIO, CANADA.

PARCEL CARRIER FOR BABY CARRIAGES AND THE LIKE.

Application filed May 12, 1928, Serial No. 277,262, and in Canada May 17, 1927.

In modern marketing the "cash and carry" plan is becoming increasingly popular but raises the problem of transportation for the purchaser. In many cases this is solved by using the baby carriage as a parcel carrier. As however the carriage usually contains a child and is, as a rule, not built any bigger than is absolutely necessary for the child's comfort, its carrying capacity is not very great. There is an opening therefore for a parcel carrier which can be attached to a baby carriage for shopping purposes and which will hold such purchases as are usually made at "cash and carry" stores.

Our object therefore is to provide a parcel carrier which may be readily attached to and detached from the handles of a baby carriage or go-cart, which will be self-adjusting to different handles, which will be neat in appearance, of good capacity, of simple and reliable construction, and, therefore, reasonable in cost.

We attain our object by providing a receptacle of flexible material with an expansible mouth having its opposite sides stiffened. At each side a flexible hanger is passed through holes at opposite sides of the mouth, and its ends are detachably connected with hooks secured to the handle of the carriage. The lower end of the receptacle is provided with spring retractible hooks adapted to be engaged with the side bars of the handle to hold the receptacle in substantial parallelism therewith.

The invention is hereinafter more fully described and illustrated in the accompanying drawings in which—.

Figure 1:
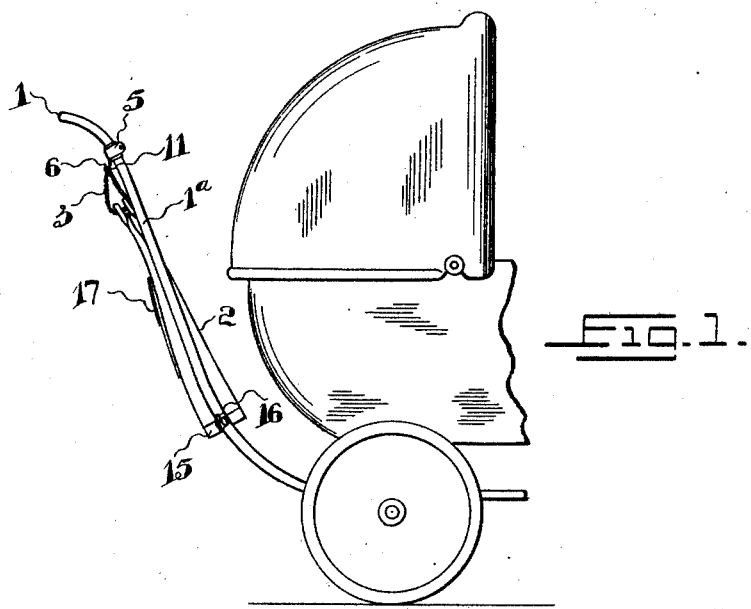
Figures 2, 3, 4:
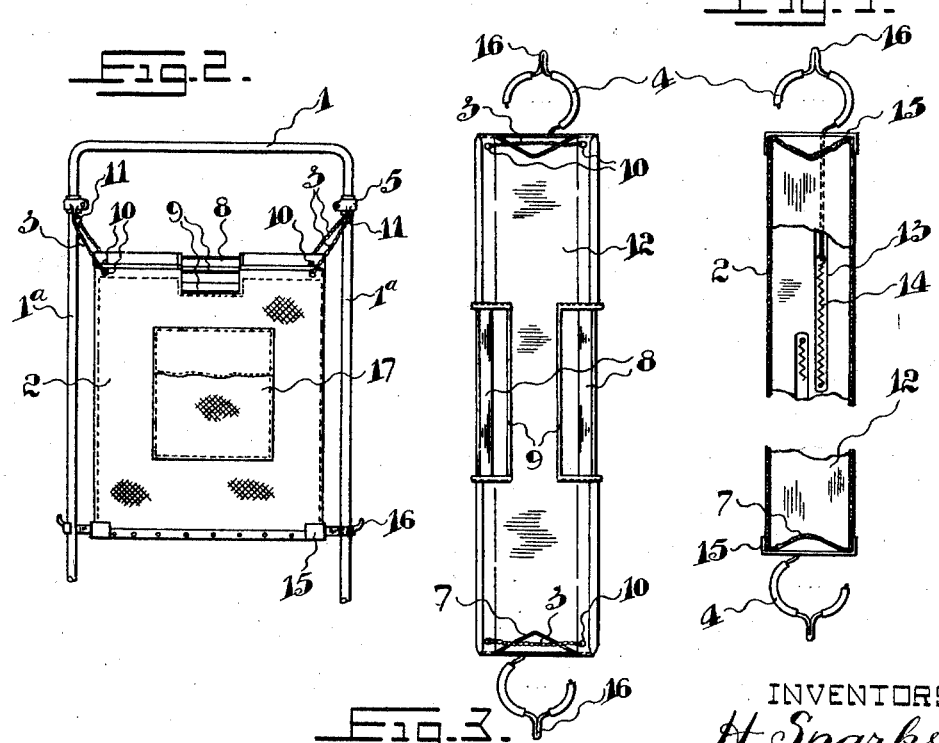

Fig. 1 is a side elevation of part of a baby carriage with our parcel carrier in position on the handle;

Fig. 2 a rear elevation of the same;

Fig. 3 a plan view of the receptacle removed from the handles, the mouth being opened; and Fig. 4 a plan view, partly broken away, of the bottom of the receptacle showing the mounting of the spring actuated hook bars.

In the drawings like numerals of reference indicate corresponding parts in the different figures.

The handle of the baby carriage includes the cross bar 1 and the side bars $1^a$. As it is desirable to have the cross bar entirely free of any incumbrance, we connect our parcel carrier solely to the side bars $1^a$.

The carrier comprises the receptacle 2, the hangers 3 and hook bars 4. 5 are clamps secured to the side bars $1^a$ adjacent the cross bar 1. Each clamp is formed with a hook 6. The receptacle is formed of canvas or other flexible material, and is preferably formed with bellows sides 7 to give it expansibility. The upper end is formed with an expansible mouth, the opposite sides of which are stiffened by means of bars 8 of wood or metal.

In order to form handles whereby the device may be carried when not attached to the vehicle, we cut out the portions 9 at the top of the receptacle to expose the bars 8, thus forming hand grips. Through opposite sides of the receptacle at each side of the mouth we form holes 10 preferably extending through the bars 8. Through these holes are passed the hangers 3, which are of flexible material such, for example, as plaited leather or chain. The ends of each hanger are provided with rings 11, or are otherwise adapted to be engaged with the hooks 6.

The bottom 12 of the receptacle is preferably solid and may be formed of wood or metal. We show it as formed of wood with recesses 13 in which are contained coil springs 14 engaged with the inner ends of the hook bars 4, which are adapted to slide through plates 15 secured to the ends of the bottom.

The hook bars are preferably formed of flat material so that they will not turn in the plates 15. The ends of the hook bars are preferably formed with grips 16, which may be grasped by the hand, to extend the hook bars when they are to be engaged with or disengaged from the side bars $1^a$. The hooks may be covered with soft material, such as rubber tubing, if desired, to prevent scratching the finish of the side bars.

The mode of use will be readily seen from the above description and on reference to the drawings. The receptacle is readily removed by disengaging the hook bars and the hangers, and is then readily loaded with parcels. On returning to the vehicle the rings 11 are engaged with the hooks 6 and the hook bars with the side bars $1^a$. The weight of the receptacle with its contents causes the hangers to draw the bars 8 towards one another to close the mouth of the receptacle. As the hangers are flexible and of some material length, and as the hook bars are extensible within certain limits, the carrier will readily adapt itself to different widths between the handle bars, this difference seldom exceeding 4 inches.

The device, it will be seen, is neat, simple, easily connected and disconnected, and has sufficient capacity for ordinary shopping purposes.

Preferably a pocket 17 for a purse, or other articles, is formed on or secured to the back of the receptacle.

What we claim is:

1. The combination with the handle of a baby carriage provided with two side bars of a receptacle having an expansible mouth provided at each side with a pair of opposed holes; a flexible hanger at each side passed through the adjacent holes; and means for detachably securing each hanger to the handle.

2. The combination with the handle of a baby carriage provided with two side bars of a receptacle having an expansible mouth provided at each side with a pair of opposed holes; stiffening bars at opposite sides of the mouth; a flexible hanger at each side passed through the adjacent holes; and means for detachably securing each hanger to the handle.

3. The combination with the handle of a baby carriage provided with two side bars of a receptacle having an expansible mouth provided at each side with a pair of opposed holes; a flexible hanger at each side passed through the adjacent holes; means for detachably securing each hanger to the handle; and means detachably securing opposite sides of the bottom of the receptacle to the side bars of the handle including springs normally in tension when the device is in position.

4. The combination with the handle of a baby carriage provided with two side bars of a receptacle provided with a mouth at its upper end; hangers swingably connecting opposite sides of the upper end of the receptacle to the side bars of the handle; and means detachably securing opposite sides of the bottom of the receptacle to the side bars of the handle including springs normally in tension when the device is in position.

5. A parcel carrier for connection to the handle of a baby carriage provided with two side bars comprising a receptacle provided with an expansible mouth provided at each side with a pair of holes; and a flexible chain or cord at each side passed through the adjacent holes, the ends of each cord being provided with means for engaging a hook or other support on the handle.

6. A parcel carrier for connection to the handle of a baby carriage provided with two side bars comprising a receptacle provided with an expansible mouth provided at each side with a pair of holes; a flexible chain or cord at each side passed through the adjacent holes, the ends of each cord being provided with means for engaging a hook or other support on the handle; and means connected with the bottom of the bag adapted for engagement with the aforesaid side bars to steady the receptacle.

7. A parcel carrier for connection to the handle of a baby carriage provided with two side bars comprising a receptacle having a mouth at its upper end; a hanger at each side of the mouth connected to the receptacle, the ends of each hanger being provided with means for engaging a hook or other support on the handle; a rigid bottom for the receptacle; two hook bars mounted on the bottom extending in opposite directions for engagement with the side bars of the handle and springs tending to retract said hook bars.

Signed at Toronto, Canada, this 9th day of May, 1928.

HARRY SPARKS.
SARAH SPARKS.